(12) United States Patent
Kroeger

(10) Patent No.: US 10,979,525 B1
(45) Date of Patent: Apr. 13, 2021

(54) SELECTIVE PREEMPTIVE CACHE POPULATION BASED ON DATA QUALITY FOR RAPID RESULT RETRIEVAL

(71) Applicant: International Business Machines Corporation, Armonk, NY (US)

(72) Inventor: Keith Kroeger, Lake Barrington, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/734,644

(22) Filed: Jan. 6, 2020

(51) Int. Cl.
*H04L 29/08* (2006.01)
*G06F 12/084* (2016.01)

(52) U.S. Cl.
CPC ........ *H04L 67/2842* (2013.01); *G06F 12/084* (2013.01); *H04L 67/2833* (2013.01); *H04L 67/322* (2013.01); *G06F 2212/1021* (2013.01)

(58) Field of Classification Search
CPC ............. H04L 67/2842; H04L 67/2833; H04L 67/322; G06F 12/084; G06F 2212/1021
See application file for complete search history.

(56) References Cited

U.S. PATENT DOCUMENTS

| | | | |
|---|---|---|---|
| 6,289,358 B1 | 9/2001 | Mattis et al. | |
| 7,110,997 B1 | 9/2006 | Turkel et al. | |
| 7,571,188 B1 | 8/2009 | Schwetman, Jr. et al. | |
| 7,921,202 B2 | 4/2011 | Bui et al. | |
| 8,032,708 B2 | 10/2011 | Gregg et al. | |
| 8,112,585 B2 | 2/2012 | Patel et al. | |
| 8,356,026 B2 * | 1/2013 | Heimendinger | G06F 16/2453 707/713 |
| 8,473,688 B2 | 6/2013 | Allen et al. | |
| 8,606,790 B2 | 12/2013 | Weissman et al. | |
| 9,355,139 B2 | 5/2016 | Lewak et al. | |
| 9,420,056 B2 | 8/2016 | Ellis et al. | |
| 10,216,861 B2 | 2/2019 | Barsness et al. | |
| 10,841,177 B2 * | 11/2020 | Lipstone | G06F 15/177 |

(Continued)

FOREIGN PATENT DOCUMENTS

| | | |
|---|---|---|
| CN | 102799644 B | 9/2015 |
| EP | 1308853 A1 | 5/2003 |

OTHER PUBLICATIONS

Malik et al., "A Personalized Preference Learning Framework for Caching in Mobile Networks," arXiv:1904.06744v1, Apr. 15, 2019, 17 pages.

(Continued)

*Primary Examiner* — Jerry B Dennison
(74) *Attorney, Agent, or Firm* — Yee & Associates, P.C.

(57) ABSTRACT

Selectively populating a cache preemptively based on data quality is provided. A set of fields corresponding to a request to analyze data for caching is obtained. A data quality measurement is calculated for fields in the set of fields corresponding to the request based on characteristics of the data in the set of fields. An aggregate data quality for a combination of fields in the set of fields is derived based on aggregation of the data quality measurement of each respective field in the combination. A result of data analysis of the combination of fields in the set of fields corresponding to the request is cached in a local cache based on the aggregate data quality for the combination of fields exceeding a minimum aggregate data quality threshold level.

20 Claims, 7 Drawing Sheets

(56) References Cited

U.S. PATENT DOCUMENTS

| | | | |
|---|---|---|---|
| 2003/0037206 A1* | 2/2003 | Benfield | G06F 16/24552 |
| | | | 711/133 |
| 2004/0249799 A1 | 12/2004 | DeMarcken et al. | |
| 2008/0209527 A1* | 8/2008 | Dudley | G06F 21/445 |
| | | | 726/5 |
| 2011/0093790 A1 | 4/2011 | Maczuba | |
| 2011/0131341 A1* | 6/2011 | Yoo | G06F 16/9574 |
| | | | 709/237 |
| 2017/0109388 A1* | 4/2017 | Brewster | G06F 16/248 |
| 2018/0173763 A1* | 6/2018 | Xia | G06F 16/2453 |
| 2018/0276256 A1* | 9/2018 | Sarkar | G06N 20/00 |
| 2018/0293908 A1* | 10/2018 | Wang | G09B 7/04 |
| 2020/0097412 A1* | 3/2020 | Chakra | G06F 12/0862 |
| 2020/0334317 A1* | 10/2020 | Ashman | G06F 16/901 |

OTHER PUBLICATIONS

Zeydan et al., "Big Data Caching for Networking: Moving from Cloud to Edge," Draft dated Jun. 7, 2016, published in IEEE Communications Magazine, vol. 54, Issue 9, Sep. 16, 2016, pp. 36-42.

* cited by examiner

US 10,979,525 B1

SELECTIVE PREEMPTIVE CACHE POPULATION BASED ON DATA QUALITY FOR RAPID RESULT RETRIEVAL

BACKGROUND

1. Field

The disclosure relates generally to data caching and more specifically to selectively populating a cache preemptively based on data quality for rapid result retrieval and increased system performance.

2. Description of the Related Art

In computing, a cache is a hardware or software component that stores data so that future requests for that data can be retrieved faster. Data stored in a cache may be the result of an earlier computation or a copy of data stored elsewhere. A cache hit occurs when requested data can be found in the cache, while a cache miss occurs when the requested data cannot be found in the cache. Cache hits are served by reading data from the cache, which is faster than recomputing a result or reading from a slower data store. As a result, the more data requests that can be served from the cache, the faster the data processing system performs. In other words, caching provides benefits both in terms of bandwidth and latency.

SUMMARY

According to one illustrative embodiment, a computer-implemented method for selectively populating a cache preemptively based on data quality is provided. A computer obtains a set of fields corresponding to a request to analyze data for caching. The computer calculates a data quality measurement for fields in the set of fields corresponding to the request based on characteristics of the data in the set of fields. The computer derives an aggregate data quality for a combination of fields in the set of fields based on aggregation of the data quality measurement of each respective field in the combination. The computer caches a result of data analysis of the combination of fields in the set of fields corresponding to the request in a local cache based on the aggregate data quality for the combination of fields exceeding a minimum aggregate data quality threshold level. According to other illustrative embodiments, a computer system and computer program product for selectively populating a cache preemptively based on data quality are provided.

DETAILED DESCRIPTION

Figure 1:
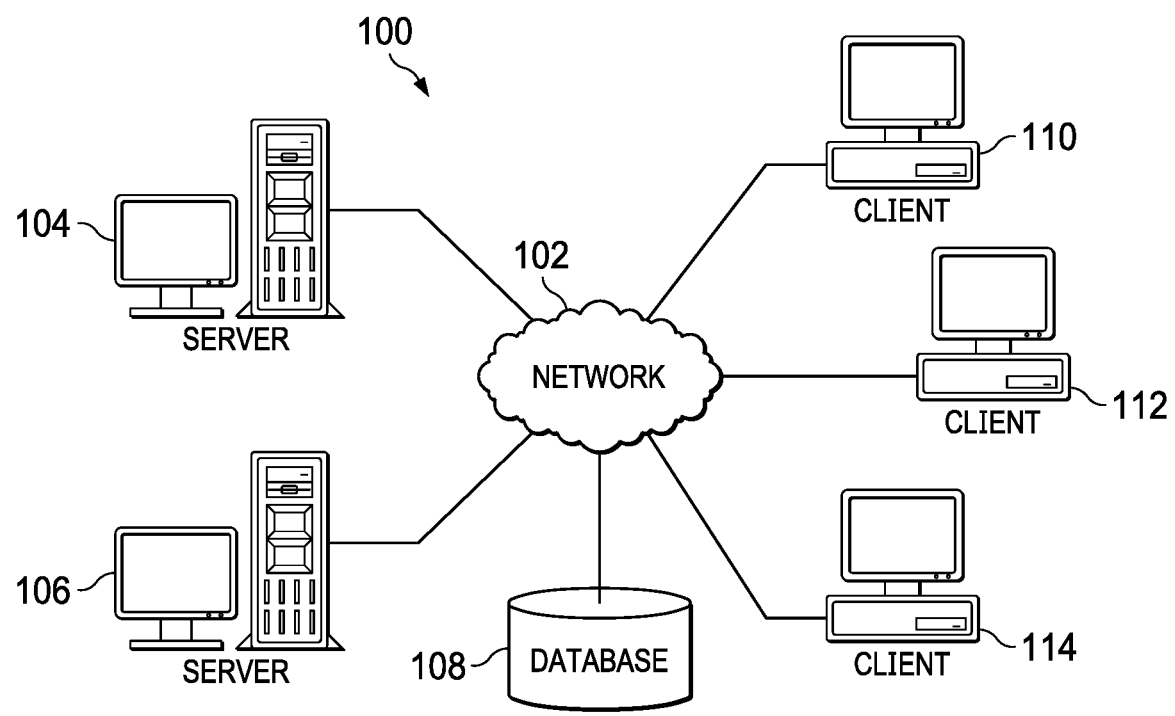
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
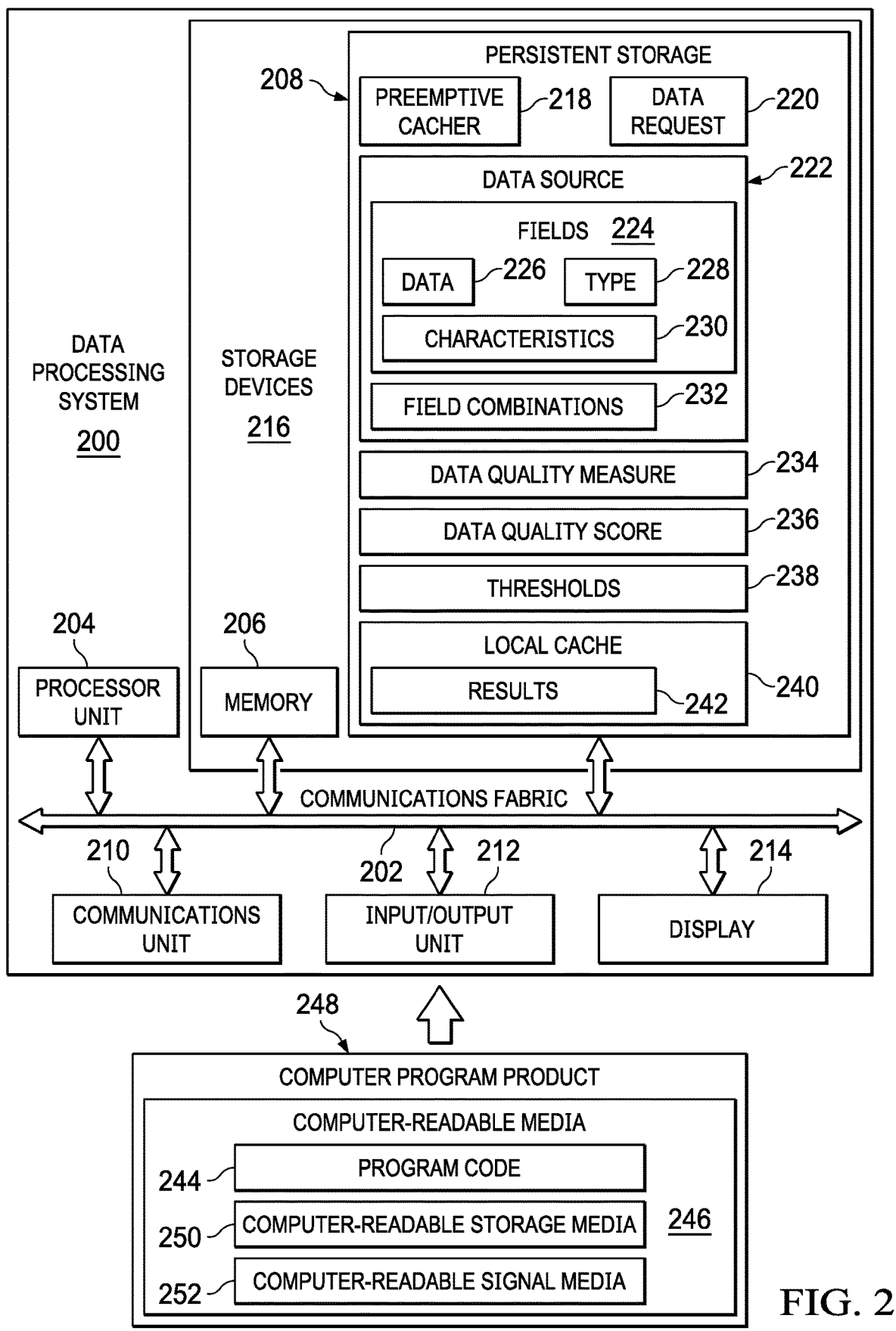
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with database 108. Server 104 and server 106 may be, for example, server computers with high-speed connections to network 102. In addition, server 104 and server 106 provide preemptive data caching services to client devices. Also, it should be noted that server 104 and server 106 may represent a cluster of servers in one or more data centers. Alternatively, server 104 and server 106 may represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the preemptive data caching services provided by server 104 and server 106.

In this example, database 108 represents a database capable of storing any type of data in a structured format, such as, for example, one or more tables or a rectangular data format. The data stored in database 108 may correspond to a specific domain, such as, for example, a business domain, an insurance domain, a medical domain, a financial domain, a banking domain, an entertainment domain, or the like, which is associated with a particular entity, such as, for example, an enterprise, organization, agency, institution, or the like. In addition, database 108 may represent a plurality of databases corresponding to a plurality of different entities. Further, database 108 may store other types of data, such as authentication or credential data that may include user names, passwords, and biometric data associated with client device users, for example.

In addition, it should be noted that network data processing system 100 may include any number of additional servers, clients, databases, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores preemptive cacher 218. However, it should be noted that even though preemptive cacher 218 is illustrated as residing in persistent storage 208, in an alternative illustrative embodiment preemptive cacher 218 may be a separate component of data processing system 200. For example, preemptive cacher 218 may be a hardware component coupled to communication fabric 202 or a combination of hardware and software components. In another alternative illustrative embodiment, a first set of components of preemptive cacher 218 may be located in data processing system 200 and a second set of components of preemptive cacher 218 may be located in a second data processing system, such as, for example, server 106 in FIG. 1. In yet another alternative illustrative embodiment, preemptive cacher 218 may be located in a client device, such as, for example, client 110 in FIG. 1, in addition to, or instead of, data processing system 200.

Preemptive cacher 218 controls the process of selectively populating a local cache with analytic results preemptively based on data quality for rapid result retrieval and increased system performance. Data request 220 represents a user request for data, such as, for example, a database query. Data request 220 also includes identification of the source of the data corresponding to data request 220, such as data source 222. Data source 222 represents an identifier of the source of the data, such as, for example, database 108 in FIG. 1, corresponding to data request 220. However, it should be noted that data source 222 is not limited to a database, but may be a set of system files, documents, directories, records, or the like.

Data source 222 includes fields 224. Fields 224 may represent fields in one or more tables, fields in rectangular data, or the like. Fields 224 contain data 226. Data 226 may represent any information. Type 228 identifies a type of data 226, such as categorical data or continuous data. Characteristics 230 identify traits, features, attributes, and properties of data 226 based on type 228 of data 226. For example, characteristics 230 of data 226 being of a categorical data type may include characteristics such as completeness, influential categories, imbalance, and the like, whereas characteristics 230 of data 226 being of a continuous data type may include characteristics such as completeness, outlier values, asymmetry, tail extremity, distribution shape, and the like.

In addition, preemptive cacher 218 generates field combinations 232 from fields 224. In this example, field combinations 232 represent pairs of fields selected from fields 224. However, it should be noted that field combinations 232 may include any size combination of fields, such as, for example, three, four, five, ten, twenty, or the like.

Further, preemptive cacher 218 generates data quality measure 234 for each field in fields 224 based on characteristics 230 of data 226 in each respective field. Data quality measure 234 represents a quality level of the information contained within each respective field. Furthermore, preemptive cacher 218 generates data quality score 236 for each field in fields 224 based on data quality measure 234 of each respective field. Moreover, preemptive cacher 218 generates data quality score 236 for each field combination in field combinations 232 based on data quality measure 234 of each field included in a particular field combination.

Preemptive cacher 218 utilizes thresholds 238 to identify high-quality data fields and field combinations within data source 222. Thresholds 238 represent user-defined thresholds that may be changed. Thresholds 238 include a minimum data quality threshold score for individual fields and an aggregate minimum data quality threshold score for combinations of fields. For example, preemptive cacher 218 only analyzes data corresponding to fields having data quality score 236 above the minimum data quality threshold score and only analyzes data corresponding to field combinations having data quality score 236 above the minimum aggregate data quality threshold score to produce results 242. In other words, results 242 represents the highest-quality data corresponding to data request 220. Also, it should be noted that results 242 may not be the actual data, but may be, for example, a summary of the actual data.

Preemptive cacher 218 stores results 242 in a local cache. Local cache 240 represents identification of a data storage area, such as, for example, a defined portion of memory 206, where the local cache is physically located for storage and fast retrieval of results 242. Preemptive cacher 218 displays results 242 on a client device, such as, for example, client 110 in FIG. 1, for the user corresponding to data request 220 to review.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

When analyzing data, users want results fast. However, generating the results on-demand is costly. Estimation and application of machine learning models and statistical tests can be quite expensive in terms of computer processing and can also require a significant amount of time to produce the results. A common technique used to accelerate the retrieval and presentation of results is caching. For example, caching is used for internet browsing to accelerate load times of pages visited in the past. Similarly, when performing statistical analyses, the input data may be cached locally to avoid retrieval times for subsequent analyses.

Caching is often classified as either lazy caching or upfront caching. In lazy caching, the cache begins with no content. When data requests are made, the results of the data requests are stored in the cache. Subsequent data requests for those results can simply be retrieved from the cache instead of generating the results. It may take some time to generate the results for the first data request, but future data requests can leverage those results to dramatically reduce response times. In upfront caching, the cache is prepopulated with results in anticipation of data requests that may be made. Consequently, there is no delay in presenting the results for any data request that is stored in the cache. Ideally, results for all potential data requests would be stored in the cache to optimize response times.

However, issues exist with both the lazy and upfront caching approaches. For example, using lazy caching the initial user experience is poor as there are no results in the cache that can be quickly retrieved. System performance improves over time as the system processes more data requests and stores the results for subsequent retrieval from the cache. However, the number of data requests that the system must process before substantial performance benefits are observed can be quite large. Using upfront caching, the time required to generate and store results for all potential data requests can be quite large. In addition, storing all of those results requires a large amount of storage space. Further, as upfront caching is anticipatory, there may be many results that are stored but never actually retrieved because no data request is ever made for those particular results.

Illustrative embodiments utilize a new upfront caching approach that selectively caches useful data preemptively to decrease result response times, while controlling storage and processing costs. For example, the cache would contain enough content to make the initial user experience responsive, but not require the time and space needed to build a comprehensive cache as in the current upfront caching approach. Illustrative embodiments do not require any history when prepopulating the cache. Illustrative embodiments use characteristics of the content being cached as the basis for caching.

Illustrative embodiments utilize characteristics corresponding to the content of a data source, such as, for example, a customer's database or file system, that reflect the content quality to determine which data request results to cache preemptively. Ideally, illustrative embodiments cache content having higher data quality scores, which indicate interesting data and potentially better results. Conversely, illustrative embodiments would not cache content having low data quality scores, which indicate uninteresting data that may be misleading and difficult to interpret.

Data quality for a data field corresponding to, for example, a table or rectangular data, or a combination of data fields can encapsulate multiple characteristics of the data. Illustrative embodiments measure these data characteristics using indices that depend on the type of data field. For example, a data field may be a categorical data field or continuous data field.

For categorical data fields, illustrative embodiments may utilize indices, such as, for example, completeness, influential categories, imbalance, and the like. Completeness indicates whether a data field contains any missing or invalid values, which may be difficult to interpret and may need special treatment, such as value imputation, before meaningful analyses can be performed. Influential categories indicate data categories with unusually high or low frequencies, which can unduly skew results. Imbalance indicates whether effects and relationships may be obscured when distribution is highly imbalanced across data categories.

For continuous data fields, illustrative embodiments may utilize indices, such as, for example, completeness, outlier values, asymmetry, tail extremity, distribution shape, and the like. Completeness again indicates whether a data field contains any missing or invalid values, which may be difficult to interpret and may need special treatment, such as value imputation, before meaningful analyses can be performed. Outlier values indicate whether extreme values (i.e., high or low) will distort interpretations of analytical results. Asymmetry indicates that results can be distorted when the location of the mass of the distribution is at either end of the distribution. Tail extremity indicates that the location of the probability mass around the distribution can affect results. Distribution shape indicates whether or not the data distribution is similar to a normal distribution.

Each index is based on a statistical value that represents a data characteristic. Illustrative embodiments standardize these statistical values across data characteristics to achieve a common scale and illustrative embodiments combine these statistical values to obtain an overall data quality measure for a particular data field. Furthermore, illustrative embodiments can combine overall data quality measures for different data fields to generate a data quality score for a particular combination of data fields. Illustrative embodiments may utilize different approaches for combining indices. For example, illustrative embodiments may take an average statistical value, possibly weighted, of all of the indices, take the maximum statistical value across the indices, or take the minimum statistical value across the indices.

Based on data quality scores, illustrative embodiments cache analytical results for fields and field combinations having the highest data quality scores. Illustrative embodiments execute corresponding analyses involving these fields and field combinations having the highest data quality scores and store the results of these analyses in a format that is amenable to fast retrieval from the cache. It should be noted that the threshold for "highest" is arbitrary and a user may change the threshold at any time. However, a low threshold level yields a larger cache size that will take longer to populate. The user can control the cache size by selection of this threshold.

The prepopulated cache can not only service data requests, but can also operate as a recommendation system. For example, illustrative embodiments can display stored cache entries containing the best or strongest (i.e., highest data quality) results without requiring any user input other than the user identifying a source of the data, such as a particular database. In addition, illustrative embodiments can also recommend stored cache entries related to current user input. For example, if a user database request currently involves the field "age", illustrative embodiments can also display to the user cached entries for field combinations that include "age".

First, illustrative embodiments identify the content to be analyzed or accessed by a data request or database query. Illustrative embodiments calculate a data quality measure for each field corresponding to the data request based on indices corresponding to the type (i.e., categorical or continuous) of the data. For field combinations, illustrative embodiments derive an aggregated data quality score based on data quality measures corresponding to each data field in a particular field combination. Illustrative embodiments identify data fields and field combinations that exceed, for example, the 75th percentile (i.e., minimum data quality threshold level), resulting in illustrative embodiments retaining the highest 25 percent of data fields and field combinations in terms of data quality. For each retained data field and field combination, illustrative embodiments run the appropriate analyses and store the results of the analyses in the cache for increased system performance.

Cache entries may include, for example, creation date, counter, access date, query identifier ("queryid"), quality, effect strength, results, and the like. Creation date is a timestamp corresponding to when the cache entry was created. Counter is a value, such as 0, 1, 2, 3, and the like, indicating how many times the cached entry has been retrieved. A counter value of 0 indicates a cache entry that was created by the initial preemptive caching process but has never been retrieved since creation. Access date is a timestamp corresponding to a most current date of retrieval of the cached entry. Queryid is a unique identifier of the database query or data request corresponding to the cached results. Illustrative embodiments use the queryid directly from a query for retrieval of cached results. Quality is an aggregated quality score for the fields used in the database query or data request. Effect strength is a numerical representation of the strength of the primary effect evaluated by the analyses. Illustrative embodiments can use the effect score to return interesting results from the cache for specific fields. Results are the analytical results of the analyses.

When a request for content is received, illustrative embodiments check the cache for corresponding results. If the results exist in the cache, illustrative embodiments return the results for processing as needed and update the metadata (e.g., counter and access date) for the cached entry to track usage. Illustrative embodiments may perform maintenance (e.g., deletion) of cache entries based on, for example, least recently used, first-in-first-out, and the like, when a size of the cache reaches a specified size, on a time interval basis, or on-demand.

Thus, illustrative embodiments provide one or more technical solutions that overcome a technical problem with preemptively populating a cache with data controlling data storage and processing requirements. As a result, these one or more technical solutions provide a technical effect and practical application in the field of data caching.

Figure 3:
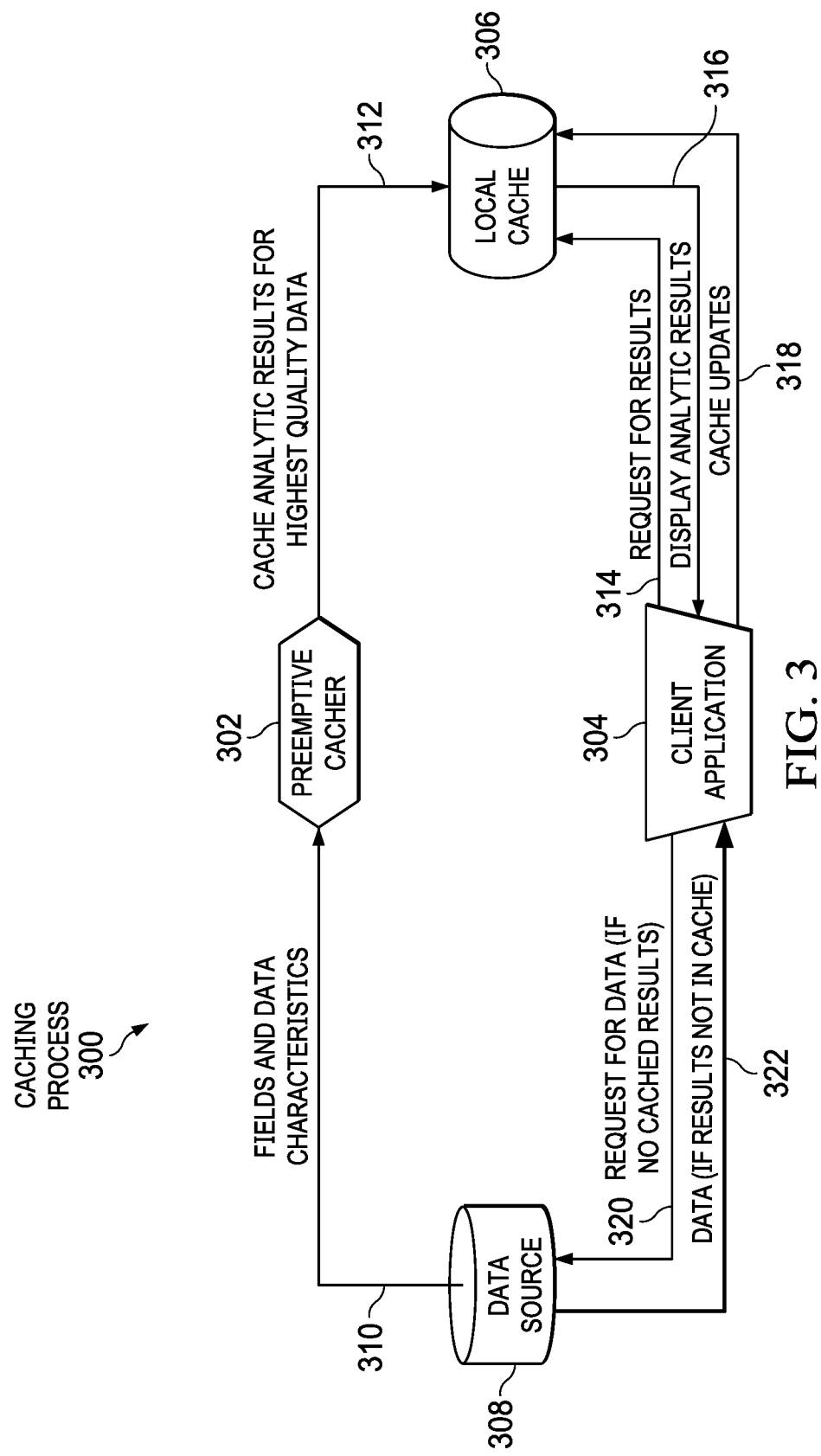
FIG. 3 is a diagram illustrating an example of a caching process in accordance with an illustrative embodiment.

With reference now to FIG. 3, a diagram illustrating an example of a caching process is depicted in accordance with an illustrative embodiment. Caching process 300 may be implemented in a network of data processing systems, such as network data processing system 100 in FIG. 1.

In this example, caching process 300 includes preemptive cacher 302, client application 304, local cache 306, and data source 308. Preemptive cacher 302 may be, for example, preemptive cacher 218 in FIG. 2. Client application 304 may be located in a client device, such as, for example, client 110 in FIG. 1.

At 310, preemptive cacher 302 submits a request for data to be analyzed for caching. The set of fields corresponding to the request includes all available fields in data source 308 and is used to build local cache 312. Preemptive cacher 302 selects which fields and field combinations to cache from this set of fields based on data quality. For example, preemptive cacher 302 identifies fields and characteristics corresponding to data in data source 308. Preemptive cacher 302 determines data quality scores for each of the fields and field combinations based on the characteristics of the data within the fields. Using thresholds, preemptive cacher 302 identifies the highest-quality data. At 312, preemptive cacher 302 caches analytic results for the highest-quality data in local cache 306 for faster retrieval.

At 314, a user of client application 304 submits a request for a subset of fields. This subset of fields is compared to contents of local cache 306 to see whether the requested information is stored there. If so, then the information is retrieved from local cache 306 and sent to the user. If the information is not in local cache 306, then the information is retrieved from data source 308, processed into results, and the results are sent to the user. For example, client application 304 sends a request for results. At 316, preemptive cacher 302 retrieves analytic results corresponding to the request from local cache 306 and displays the analytic results on the client device corresponding to client application 304. At 318, preemptive cacher 302 updates metadata, such as, for example, counter and data, corresponding to the analytic results retrieved from local cache 306 for maintenance of local cache 306 (e.g., removal of old, stale, or unused data from local cache 306). At 320, if no cached results are found in local cache 306, then the request for data is sent to data source 308. Data source 308 may be, for example, database 108 in FIG. 1. At 322, if results are not in local cache 306, data source 308 sends data to client application 304 in response to the request for data.

Figure 4A:
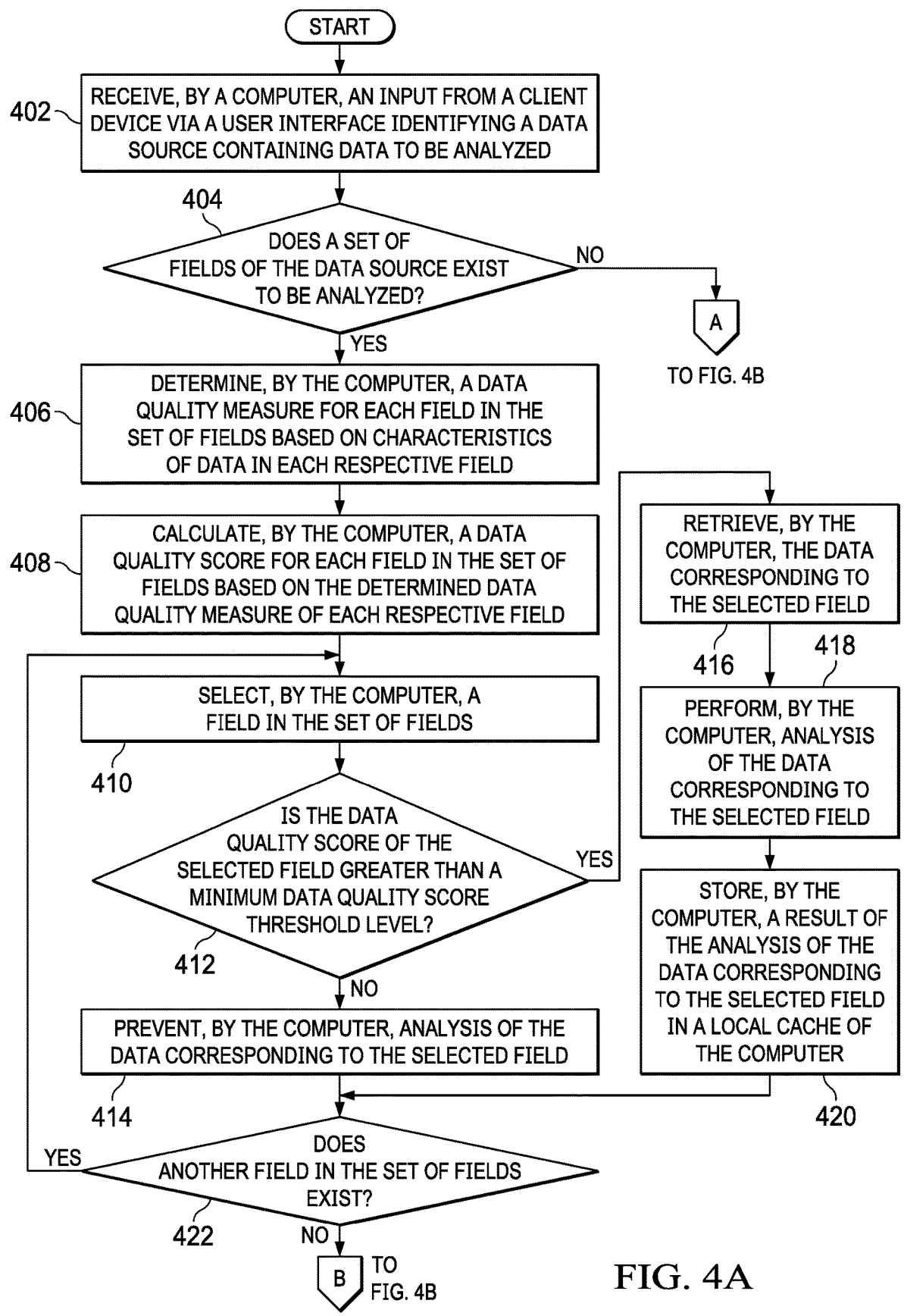
FIGS. 4A-4B are a flowchart illustrating a process for selectively populating a cache preemptively based on data quality in accordance with an illustrative embodiment.
Figure 4B:
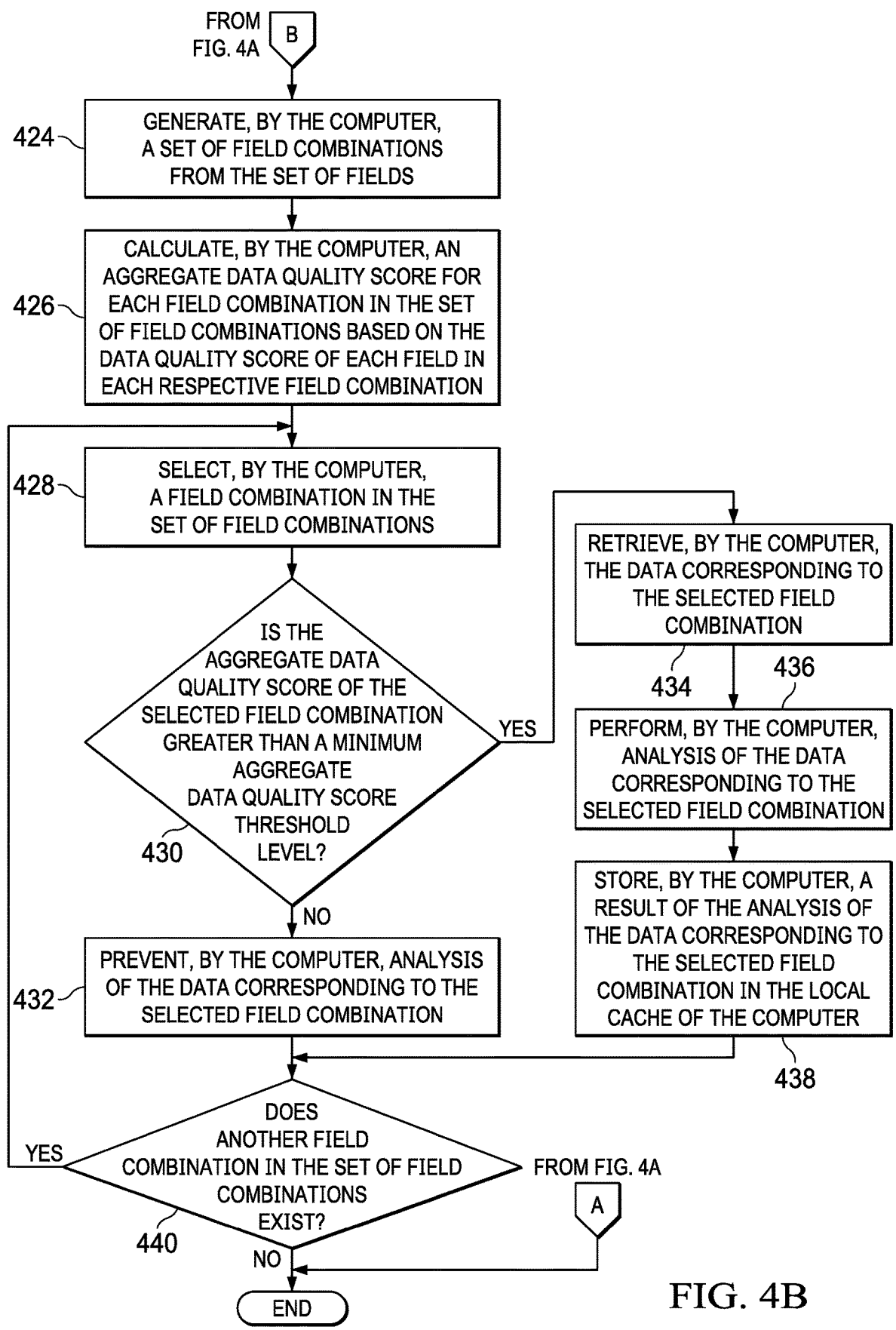

With reference now to FIGS. 4A-4B, a flowchart illustrating a process for selectively populating a cache preemptively based on data quality is shown in accordance with an illustrative embodiment. The process shown in FIGS. 4A-4B may be implemented in a computer, such as, for example, server 104 in FIG. 1 or data processing system 200 in FIG. 2.

The process begins when the computer receives an input from a client device via a user interface identifying a data source containing data to be analyzed (step 402). The computer makes a determination as to whether a set of fields of the data source exists to be analyzed (step 404). If the computer determines that a set of fields of the data source does not exist to be analyzed, no output of step 404, then the process terminates thereafter. If the computer determines that a set of fields of the data source does exist to be analyzed, yes output of step 404, then the computer determines a data quality measure for each field in the set of fields based on characteristics of data in each respective field (step 406). In addition, the computer calculates a data quality score for each field in the set of fields based on the determined data quality measure of each respective field (step 408).

Subsequently, the computer selects a field in the set of fields (step 410). The computer makes a determination as to whether the data quality score of the selected field is greater than a minimum data quality score threshold level (step 412). If the computer determines that the data quality score of the selected field is not greater than the minimum data quality score threshold level, no output of step 412, then the computer prevents analysis of the data corresponding to the selected field (step 414) and the process proceeds to step 422 thereafter. If the computer determines that the data quality score of the selected field is greater than the minimum data quality score threshold level, yes output of step 412, then the computer retrieves the data corresponding to the selected field (step 416). Further, the computer performs analysis of the data corresponding to the selected field (step 418). Furthermore, the computer stores a result of the analysis of the data corresponding to the selected field in a local cache of the computer (step 420).

Afterward, the computer makes a determination as to whether another field in the set of fields exist (step 422). If the computer determines that another field in the set of fields does exist, yes output of step 422, then the process returns to step 410 where the computer selects another field in the set of fields. If the computer determines that another field in the set of fields does not exist, no output of step 422, then the computer generates a set of field combinations from the set of fields (step 424). Moreover, the computer calculates an aggregate data quality score for each field combination in the set of field combinations based on the data quality score of each field in each respective field combination (step 426).

Subsequently, the computer selects a field combination in the set of field combinations (step 428). The computer makes a determination as to whether the aggregate data quality score of the selected field combination is greater than a minimum aggregate data quality score threshold level (step 430). If the computer determines that the aggregate data quality score of the selected field combination is not greater than the minimum aggregate data quality score threshold level, no output of step 430, then the computer prevents analysis of the data corresponding to the selected field combination (step 432) and the process proceeds to step 440 thereafter. If the computer determines that the aggregate data quality score of the selected field combination is greater than the minimum aggregate data quality score threshold level, yes output of step 430, then the computer retrieves the data corresponding to the selected field combination (step 434). Further, the computer performs analysis of the data corresponding to the selected field combination (step 436). Furthermore, the computer stores a result of the analysis of the data corresponding to the selected field combination in the local cache of the computer (step 438).

Afterward, the computer makes a determination as to whether another field combination in the set of field combinations exists (step 440). If the computer determines that another field combination in the set of field combinations does exist, yes output of step 440, then the process returns to step 428 where the computer selects another field combination in the set of field combinations. If the computer determines that another field combination in the set of field combinations does not exist, no output of step 440, then the process terminates thereafter.

Figure 5:
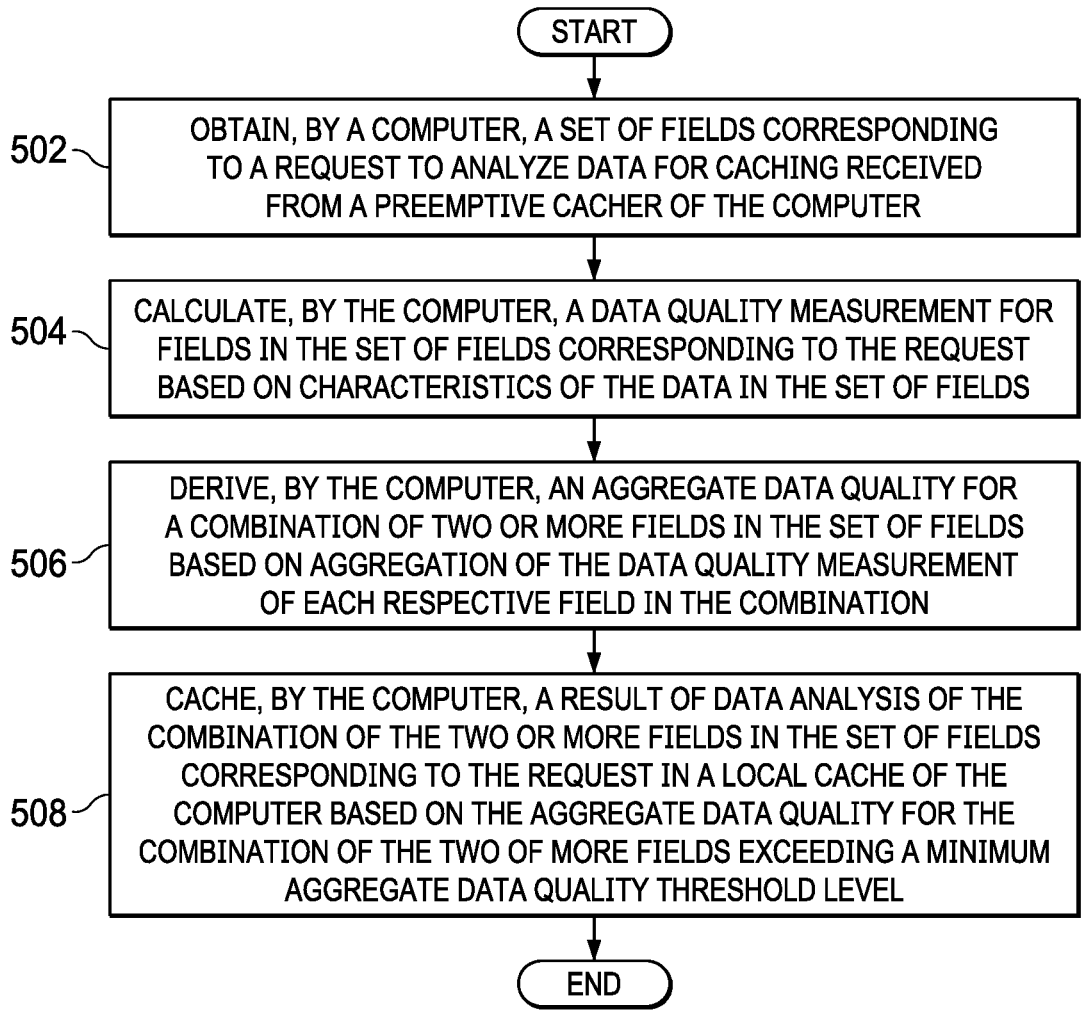
FIG. 5 is a flowchart illustrating a process for caching a result in accordance with an illustrative embodiment.

With reference now to FIG. 5, a flowchart illustrating a process for caching a result is shown in accordance with an illustrative embodiment. The process shown in FIG. 5 may be implemented in a computer, such as, for example, server 104 in FIG. 1 or data processing system 200 in FIG. 2.

The process begins when the computer obtains a set of fields corresponding to a request to analyze data for caching submitted by a preemptive cacher of the computer (step 502). The computer calculates a data quality measurement for fields in the set of fields corresponding to the request based on characteristics of the data in the set of fields (step 504). The computer derives an aggregate data quality for a combination of two or more fields in the set of fields based on aggregation of the data quality measurement of each respective field in the combination (step 506). The computer caches a result of data analysis of the combination of the two or more fields in the set of fields corresponding to the request in a local cache of the computer based on the aggregate data quality for the combination of the two or more fields exceeding a minimum aggregate data quality threshold level (step 508).

Figure 6:
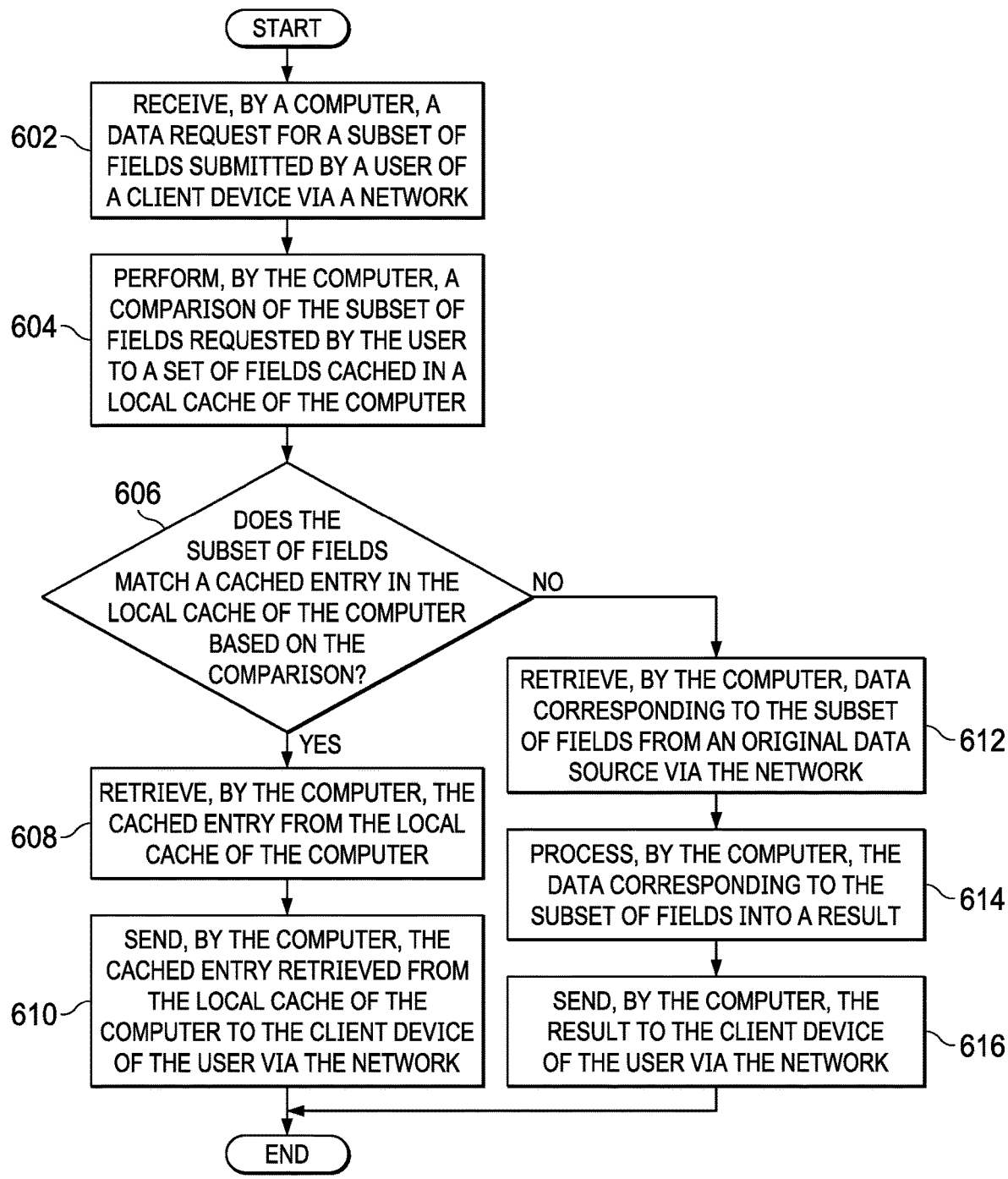
FIG. 6 is a flowchart illustrating a process for requesting a subset of fields in accordance with an illustrative embodiment.

With reference now to FIG. 6, a flowchart illustrating a process for requesting a subset of fields is shown in accordance with an illustrative embodiment. The process shown in FIG. 6 may be implemented in a computer, such as, for example, server 104 in FIG. 1 or data processing system 200 in FIG. 2.

The process begins when the computer receives a data request for a subset of fields submitted by a user of a client device via a network (step 602). The computer performs a comparison of the subset of fields requested by the user to a set of fields cached in a local cache of the computer (step 604). The computer makes a determination as to whether the subset of fields matches a cached entry in the local cache of the computer based on the comparison (step 606).

If the computer determines that the subset of fields does match a cached entry in the local cache of the computer based on the comparison, yes output of step 606, then the computer retrieves the cached entry from the local cache of the computer (step 608). The computer sends the cached entry retrieved from the local cache of the computer to the client device of the user via the network (step 610). As an example, the user submits a data request for fields X and Y. The local cache contains results for regressing Y on X. Because the cached results are based on fields X and Y in the data request, the cached results are returned. In other words, the subset of fields in the user's data request is a key for returning any information from the cache that matches the key. This allows the local cache to contain analytical results or raw data based on quality. Either way, whatever is cached that matches the subset of fields in the user's data request is returned. Thereafter, the process terminates.

Returning again to step 606, if the computer determines that the subset of fields does not match a cached entry in the local cache of the computer based on the comparison, no output of step 606, then the computer retrieves data corresponding to the subset of fields from an original data source via the network (step 612). The computer processes the data corresponding to the subset of fields into a result (step 614). The computer sends the result to the client device of the user via the network (step 616). Thereafter, the process terminates.

Thus, illustrative embodiments of the present invention provide a computer-implemented method, computer system, and computer program product for selectively populating a cache preemptively based on data quality for rapid result retrieval and increased system performance. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively populating a cache preemptively based on data quality, the computer-implemented method comprising:

obtaining, by a computer, a set of fields corresponding to a request to analyze data for caching;

calculating, by the computer, a data quality measurement for each field in the set of fields corresponding to the request based on characteristics of the data in the set of fields;

deriving, by the computer, an aggregate data quality for a combination of fields in the set of fields based on aggregation of the data quality measurement of each respective field in the combination; and caching, by the computer, a result of data analysis of the combination of fields in the set of fields corresponding to the request in a local cache based on the aggregate data quality for the combination of fields exceeding a minimum aggregate data quality threshold level.

2. The computer-implemented method of claim 1 further comprising:
receiving, by the computer, an input via a user interface identifying a data source containing the data to be analyzed;
determining, by the computer whether the set of fields of the data source exists to be analyzed; and
responsive to the computer determining that the set of fields of the data source does exist to be analyzed, determining, by the computer, a data quality measure for each field in the set of fields based on characteristics of data in each respective field.

3. The computer-implemented method of claim 2 further comprising: calculating, by the computer, a data quality score for each field in the set of fields based on the data quality measure of each respective field.

4. The computer-implemented method of claim 3 further comprising:
selecting, by the computer, a field in the set of fields; and
determining, by the computer, whether the data quality score of the selected field is greater than a minimum data quality score threshold level.

5. The computer-implemented method of claim 4 further comprising:
responsive to the computer determining that the data quality score of the selected field is greater than the minimum data quality score threshold level, retrieving, by the computer, the data corresponding to the selected field, performing, by the computer, analysis of the data corresponding to the selected field, and storing, by the computer, a result of the analysis of the data corresponding to the selected field in the local cache.

6. The computer-implemented method of claim 4 further comprising:
responsive to the computer determining that the data quality score of the selected field is not greater than the minimum data quality score threshold level, preventing, by the computer, analysis of the data corresponding to the selected field.

7. The computer-implemented method of claim 3 further comprising:
generating, by the computer, a set of field combinations from the set of fields; and
calculating, by the computer, an aggregate data quality score for each field combination in the set of field combinations based on the data quality score of each field in each respective field combination.

8. The computer-implemented method of claim 7 further comprising:
selecting, by the computer, a field combination in the set of field combinations; and
determining, by the computer, whether the aggregate data quality score of the selected field combination is greater than a minimum aggregate data quality score threshold level.

9. The computer-implemented method of claim 8 further comprising:
responsive to the computer determining that the aggregate data quality score of the selected field combination is greater than the minimum aggregate data quality score threshold level, retrieving, by the computer, the data corresponding to the selected field combination, performing, by the computer, analysis of the data corresponding to the selected field combination, and storing, by the computer, a result of the analysis of the data corresponding to the selected field combination in the local cache.

10. The computer-implemented method of claim 8 further comprising:
responsive to the computer determining that the aggregate data quality score of the selected field combination is not greater than the minimum aggregate data quality score threshold level, preventing, by the computer, analysis of the data corresponding to the selected field combination.

11. The computer-implemented method of claim 1, wherein a field in the set of fields is one of a categorical data field and a continuous data field, and wherein characteristics of the categorical data field include completeness, influential categories, and imbalance, and wherein characteristics of the continuous data field include completeness, outlier values, asymmetry, tail extremity, and distribution shape.

12. The computer-implemented method of claim 1, wherein a cache entry in the local cache includes creation date, counter, access date, query identifier, quality, effect strength, and results, and wherein the results are the result of the data analysis.

13. The computer-implemented method of claim 1 further comprising:
receiving, by the computer, a data request for a subset of fields submitted by a user of a client device via a network;
performing, by the computer, a comparison of the subset of fields requested by the user to a set of fields cached in the local cache;
responsive to the computer determining that the subset of fields matches a cached entry in the local cache based on the comparison, retrieving, by the computer, the cached entry from the local cache and sending, by the computer, the cached entry retrieved from the local cache to the client device of the user via the network.

14. A computer system for selectively populating a cache preemptively based on data quality, the computer system comprising:
a bus system;
a storage device connected to the bus system, wherein the storage device stores program instructions; and
a processor connected to the bus system, wherein the processor executes the program instructions to:
obtain a set of fields corresponding to a request to analyze data for caching;
calculate a data quality measurement for each field in the set of fields corresponding to the request based on characteristics of the data in the set of fields;
derive an aggregate data quality for a combination of fields in the set of fields based on aggregation of the data quality measurement of each respective field in the combination; and
cache a result of data analysis of the combination of fields in the set of fields corresponding to the request in a local cache based on the aggregate data quality for the combination of fields exceeding a minimum aggregate data quality threshold level.

15. The computer system of claim 14, wherein the processor further executes the program instructions to:
receive an input via a user interface identifying a data source containing the data to be analyzed;
determine whether the set of fields of the data source exists to be analyzed; and
determine a data quality measure for each field in the set of fields based on characteristics of data in each respective field in response to determining that the set of fields of the data source does exist to be analyzed.

16. A computer program product for selectively populating a cache preemptively based on data quality, the computer program product comprising a computer readable storage medium having program instructions embodied therewith, the program instructions executable by a computer to cause the computer to perform a method comprising:

obtaining, by the computer, a set of fields corresponding to a request to analyze data for caching;

calculating, by the computer, a data quality measurement for each field in the set of fields corresponding to the request based on characteristics of the data in the set of fields;

deriving, by the computer, an aggregate data quality for a combination of fields in the set of fields based on aggregation of the data quality measurement of each respective field in the combination; and caching, by the computer, a result of data analysis of the combination of fields in the set of fields corresponding to the request in a local cache based on the aggregate data quality for the combination of fields exceeding a minimum aggregate data quality threshold level.

17. The computer program product of claim 16 further comprising:

receiving, by the computer, an input via a user interface identifying a data source containing the data to be analyzed;

determining, by the computer whether the set of fields of the data source exists to be analyzed; and responsive to the computer determining that the set of fields of the data source does exist to be analyzed, determining, by the computer, a data quality measure for each field in the set of fields based on characteristics of data in each respective field.

18. The computer program product of claim 17 further comprising:

calculating, by the computer, a data quality score for each field in the set of fields based on the data quality measure of each respective field.

19. The computer program product of claim 18 further comprising:

selecting, by the computer, a field in the set of fields; and determining, by the computer, whether the data quality score of the selected field is greater than a minimum data quality score threshold level.

20. The computer program product of claim 19 further comprising:

responsive to the computer determining that the data quality score of the selected field is greater than the minimum data quality score threshold level, retrieving, by the computer, the data corresponding to the selected field, performing, by the computer, analysis of the data corresponding to the selected field, and storing, by the computer, a result of the analysis of the data corresponding to the selected field in the local cache.

\* \* \* \* \*